M. F. HIPSHER.
HOOK AND EYE CLEVIS.
APPLICATION FILED JULY 18, 1917.
1,253,971.
Patented Jan. 15, 1918.
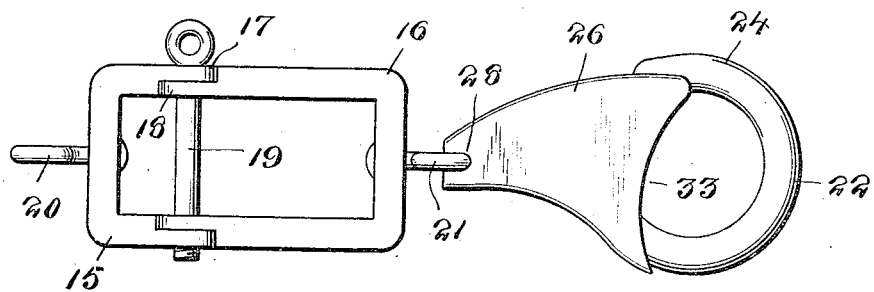
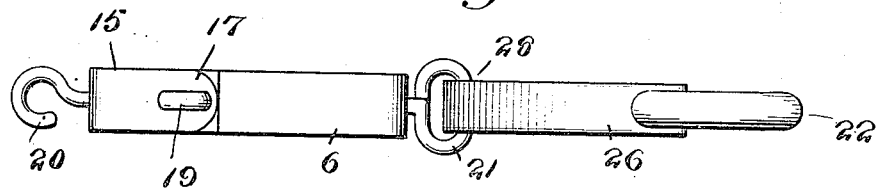
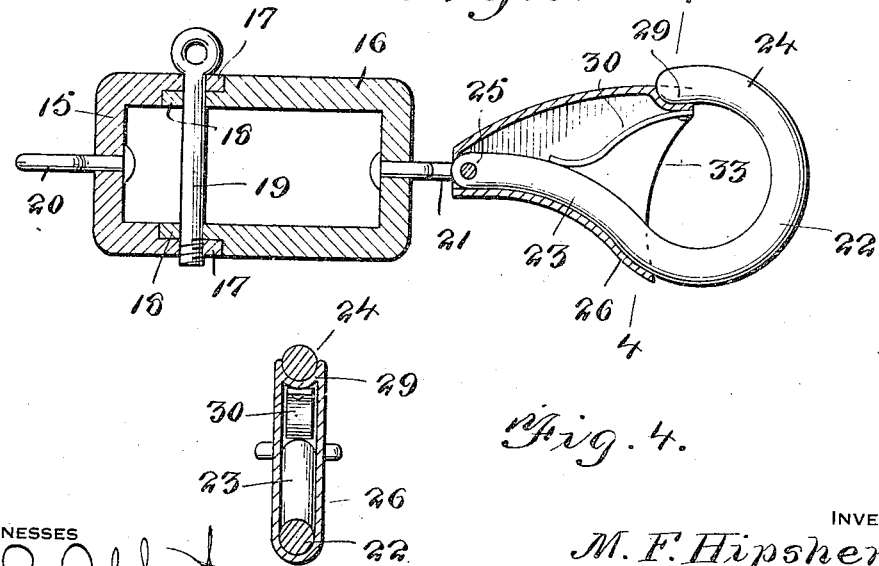
INVENTOR
M. F. Hipsher
BY Victor J. Evans
ATTORNEY
WITNESSES

UNITED STATES PATENT OFFICE.

MACK F. HIPSHER, OF IDOL, TENNESSEE.

HOOK-AND-EYE CLEVIS.

1,253,971.

Specification of Letters Patent.  Patented Jan. 15, 1918.

Application filed July 18, 1917. Serial No. 181,389.

*To all whom it may concern:*

Be it known that I, MACK F. HIPSHER, a citizen of the United States, residing at Idol, in the county of Grainger and State of Tennessee, have invented new and useful Improvements in Hook-and-Eye Clevises, of which the following is a specification.

This invention relates to clevises and to hooks used in connection therewith, and it has for its object to produce a clevis and hook that will be capable of being universally used wherever such devices are employed.

A further object of the invention is to simplify and improve the construction of the clevis as well as of the hook.

A further object of the invention is to produce a safety hook of general application.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being however, understood that no limitation is necessarily made to the precise structural details therein exhibited, but that changes, alterations and modifications within the scope of the claims may be resorted to when desired.

In the drawing:

Figure 1 is a side view of a clevis and hook constructed in accordance with the invention.

Fig. 2 is a plan view of the same.

Fig. 3 is a longitudinal sectional view.

Fig. 4 is a transverse sectional view taken on the line 4—4 in Fig. 3.

Corresponding parts in the several figures of the drawing are denoted by like characters of reference.

The clevis part of the device is composed of two substantially U-shaped members 15 and 16. The member 15 is shown as provided with lips 17, engaging corresponding lips 18 of the member 16. The lips 17 are formed adjacent to the outer faces of the limbs of the U-shaped member 15 while the lips 18 have been shown as being formed adjacent to the inner faces of the limbs of the member 16, thus enabling the lips 18 to be overlapped by the lips 17. The end walls of the several lips are moreover made of arcuate form, as best seen in Fig. 2, enabling the said members 15 and 16 to be swingingly connected together by a connecting member such as a bolt 19 that extends through the several lips 17 and 18.

The bridge portions of the members 15 and 16 are longitudinally apertured for the passage of a swivel hook 20 and a swivel eye 21, respectively, as shown.

The hook member 22 is of oval form, said hook member having a shank 23 and a bill 24, the shank being provided with an aperture 25 that engages the swivel eye 21 of the clevis member. 26 is a housing having side walls 27 which are provided with apertures 28, also engaging the swivel eye 21 which latter serves to assemble the housing with the hook. The housing has a recess or depression 29 in the upper portion thereof, facing and engaging the bill 24 of the hook member; riveted or otherwise secured in the inner face of the depressed portion 29 is a spring 30 that extends within the housing 26, between the side walls thereof, and in engagement with the shank 23 of the hook, said spring serving to maintain the depressed portion of the housing in engagement with the bill of the hook. The parts are so proportioned that when the recess or depressed portion of the housing is in engagement with the bill of the hook, the bottom wall of the housing will lie substantially in contact with the bottom face of the shank 23. The end of the housing which faces the arcuate portion 22 of the hook is rounded or concaved, as seen at 33, so that a link or other device may be readily introduced between the housing and the hook. The spring actuated housing obviously constitutes a safety catch that will prevent accidental detachment from the hook of any ring or other element placed in engagement therewith.

The clevis part of the device may be readily and usefully employed in the manufacture of swingletrees, doubletrees, and for all purposes for which clevises are ordinarily employed. When applied to the ends of a swingletree, the hook member constitutes a convenient and useful trace attaching device.

Having thus described the invention, what is claimed as new is:

1. A clevis link comprising two substantially U-shaped members having interengaging tongues with arcuate front walls and a pivot member extending through said tongues and assembling said U-shaped members for independent swinging movement.

2. A clevis link comprising two U-shaped members having interengaging terminal tongues, in combination with a bolt whereby said U-shaped members are swingingly assembled together, said bolt having threaded engagement with one of said members.

3. A clevis link comprising two substantially U-shaped members, a pivot member whereby said U-shaped members are connected together for swinging movement about the axis of said pivot member, and additional pivot members engaging the U-shaped members to permit the link to swing about an axis substantially at right angles to the axis of the first-mentioned pivot member.

In testimony whereof I affix my signature.

MACK F. HIPSHER.